(12) United States Patent
Risson

(10) Patent No.: US 7,068,840 B2
(45) Date of Patent: Jun. 27, 2006

(54) DETERMINATION OF AN ILLUMINANT OF DIGITAL COLOR IMAGE BY SEGMENTATION AND FILTERING

(75) Inventor: Valery J. Risson, Paris (FR)

(73) Assignee: Eastman Kodak Company, Rochester, NY (US)

(*) Notice: Subject to any disclaimer, the term of this patent is extended or adjusted under 35 U.S.C. 154(b) by 761 days.

(21) Appl. No.: 10/302,400

(22) Filed: Nov. 22, 2002

(65) Prior Publication Data

US 2003/0095704 A1 May 22, 2003

(30) Foreign Application Priority Data

Nov. 22, 2001 (FR) .................................. 01 15098

(51) Int. Cl.
  *G06K 9/00* (2006.01)
  *G06K 9/40* (2006.01)
(52) U.S. Cl. ....................................... 382/164; 382/260
(58) Field of Classification Search ................ 382/115, 382/118, 162, 164, 173, 190, 224, 254, 260; 358/500, 509, 512, 515, 520, 530
See application file for complete search history.

(56) References Cited

U.S. PATENT DOCUMENTS

| 4,685,071 | A | * | 8/1987 | Lee | 382/162 |
| 5,495,428 | A | * | 2/1996 | Schwartz | 382/164 |
| 5,585,944 | A | * | 12/1996 | Rodriguez | 358/500 |
| 6,104,830 | A | * | 8/2000 | Schistad | 382/167 |
| 6,661,907 | B1 | * | 12/2003 | Ho et al. | 382/118 |
| 6,697,502 | B1 | * | 2/2004 | Luo | 382/115 |
| 6,718,063 | B1 | * | 4/2004 | Lennon et al. | 382/224 |
| 6,859,554 | B1 | * | 2/2005 | Porikli et al. | 382/173 |
| 2003/0095704 | A1 | * | 5/2003 | Risson | 382/162 |

OTHER PUBLICATIONS

Cooper, T. J., "Color Segmentation as an Aid to White Balancing for Digital Still Cameras"; Color Imaging: Device-Independent Color, Color Hardcopy, and Graphic Arts VI, San Jose, CA, USA, Jan. 23-26, 2001, vol. 4300, pp. 164-171, XP008009707; Proceedings of the SPIE—The International Society for Optical Engineering, 2001, SPIE-Int. Soc. Opt. Eng., USA: issn: 0277-786x, p. 165, lines 31-50.

Graham D. Finlayson and Gerald Schaefer, "Solving of Colour Constancy Using a Constrained Dichromatic Reflection Model", published in May 2001, in International Journal of Computer Vision 42(3), pp. 126-144, by Kluwer Academic Publishers.

* cited by examiner

*Primary Examiner*—Amir Alavi
(74) *Attorney, Agent, or Firm*—David A. Novais; Kathleen Neuner Manno

(57) ABSTRACT

The present invention is in the technical field of analyzing and processing digitized color images. More specifically it relates to a method of determining the chromaticity of an illuminant (white reference) of a color image representing a natural scene of objects or entities. The present invention uses the principle of the constancy of dichromatic color, but it also uses spatial color segmentation of the image and relevant filtering to select the regions of the image to be analyzed, that is to extract the analyzed regions non-compliant with the chromatic model. The invention is applicable for improving the performance of the means of analysis and recognition of the shapes of objects in an image.

12 Claims, 5 Drawing Sheets

DETERMINATION OF AN ILLUMINANT OF DIGITAL COLOR IMAGE BY SEGMENTATION AND FILTERING

This is a U.S. original application which claims priority on French patent application No. 0115098 filed Nov. 22, 2001.

FIELD OF THE INVENTION

The present invention is in the technical field of analyzing and processing digitized color images. More specifically, the invention relates to the determination of the chromaticity of an illuminant (white reference) of a color image representing a natural scene of objects or entities. The illuminant is characterized by the spectral distribution of a light source lighting or illuminating the scene of the color image.

BACKGROUND OF THE INVENTION

The determination of the chromaticity of the illuminant of an image is already known in the state of the art. The determination of the chromaticity of an illuminant of a color image in particular improves the performance of the means of analysis and shape recognition in an image. Knowledge of the illuminant also enables the automatic indexing of color images, according to the lighting conditions. The automatic indexing of images, for example, enables images to be classified according to weather conditions linked to the respective scenes of images: sunshine, cloud cover, etc.

U.S. Pat. No. 4,685,071 describes a method to determine the illuminant of a scene in an image comprising many colors, based on the detection of the specularities in the color image. The light coming from a specular reflection is considered to have a chromaticity similar to that of the light from the direct source (the illuminant). The light coming from the specular reflection is not filtered by the pigments of the irregular material receiving this light. Examples of irregular colored surfaces are scenes representing facial skin, foliage, etc. Consequently, for these irregular surfaces, the specular component of the reflected light has a spectral energy distribution very near to that of the incident light. Therefore the color of the specular component is very near to the color of the light source illuminating the surface. Thus the color of the illuminant of the image surface can be derived from the specular component.

U.S. Pat. No. 5,495,428 describes an electronic method of statistical calculation using the chrominance analysis (signals containing color information) of a digital image representing a natural scene comprising many colors. This method enables measurement of the distribution of the image colors, representation of pixel sets of related colors, and determination of the point of chromatic convergence that enables the illuminant's chromaticity to be obtained.

In the two above-mentioned patents, the color image is analyzed only in the chromatic diagram. No reference is made to the image spatial plane, in which spatial relationships can be taken into account.

The publication "Solving for Colour Constancy using a Constrained Dichromatic Reflection Model" by Finlayson and Schaeffer, published in May 2001, in International Journal of Computer Vision 42(3), pages 127–144, by Kluwer Academic Publishers, describes a method for estimating an illuminant by combining physical data from image chrominance data and illuminant statistical data. However, spatial relationships are not taken into account. Indeed, the search for chromatic convergence is performed on the pixel set of the image referred to the chromatic plane. However, this type of method has limits, in the sense that it is not very robust and does not always find a solution for an irregular image that has a significant variety of colors, as it is case for example in a natural image representing a landscape comprising zones of shadows and/or sky. This method is also sensitive to the image contents.

SUMMARY OF THE INVENTION

It is an object of the present invention to provide a method that enables the determination of the illuminant of a digital color image representing a natural scene (e.g. a natural landscape) comprising entities or objects, whatever the geometrical contents and spectrum of the scene represented in the image.

The present invention, following the example of U.S. Pat. Nos. 4,685,071 and 5,495,428, uses the principle of dichromatic color constancy, but in addition uses spatial color segmentation of the image and filtering, to select the regions of the image to be analyzed. The spatial segmentation of the image enables the analyzed image to be divided into spatially homogeneous color regions. By segmenting the image spatially, the method of the present invention enables segments to be obtained that correspond strictly with an homogeneous entity or object of a scene of the image. The homogeneity generally concerns the spectral reflectance of the image. This, in contrast to an image analysis in the color space that groups all the pixels of the same color in a single set, thus making the analysis less precise.

Compared with the prior art, the present invention also implements, after the step of spatial image segmentation, filtering that extracts analyzed regions not compliant with the dichromatic reflection model. This selection of regions is performed according to their color signal (chrominance) and their identification as a region of sky or a region of shadow. Compared with U.S. Pat. No. 4,685,071, which uses a dichromatic reflection model that can only apply to the lit and reflecting surfaces of an image, the present invention has the advantage of excluding from the search, parts of the image scene that comprise regions of shadow, and/or sky, and/or achromatic (colorless) regions. Thus the present invention method is robust, whatever the image contents.

The present invention therefore provides for an automatic method for determining an illuminant of a digital color image which comprises the steps of:
a) segmenting an image into regions of homogeneous color;
b) extracting the regions from the segmented image that are non-compliant with a dichromatic reflection model;
c) for each region not extracted from the image, determining from chromatic coordinates of pixels forming the region, a straight line representing a direction of a chromatic convergence;
d) determining a most probable convergence point of a set of the straight lines obtained in said step c); and
e) determining chromatic coordinates of the most probable convergence point obtained in said step d) and representing an illuminant of the color image.

Other characteristics will appear on reading the following description, with reference to the drawings of the various figures.

DETAILED DESCRIPTION OF THE INVENTION

The following description is a detailed description of the main embodiments of the invention, with reference to the drawings in which different numerical references identify different or similar elements in each of the figures.

The method of the invention is implemented in an environment that enables the finding and viewing of previously recorded and memorized digital color images. These color images are, for example, still or moving digital images, which were recorded by using digital image acquisition devices. It is an object of the present invention to provide a method to determine the chromatic coordinates of an illuminant of a digital color image. The determination of this illuminant enables the semantic analysis of images whose illuminant has been determined. This is to be able, for example, to automatically index a database of color images. In particular indexing enables images to be classified according to characteristics linked to the respective illuminants of the images. This illuminant corresponds to different lighting conditions: for example, tungsten lighting, diffused or direct natural light, etc.

Figure 1:
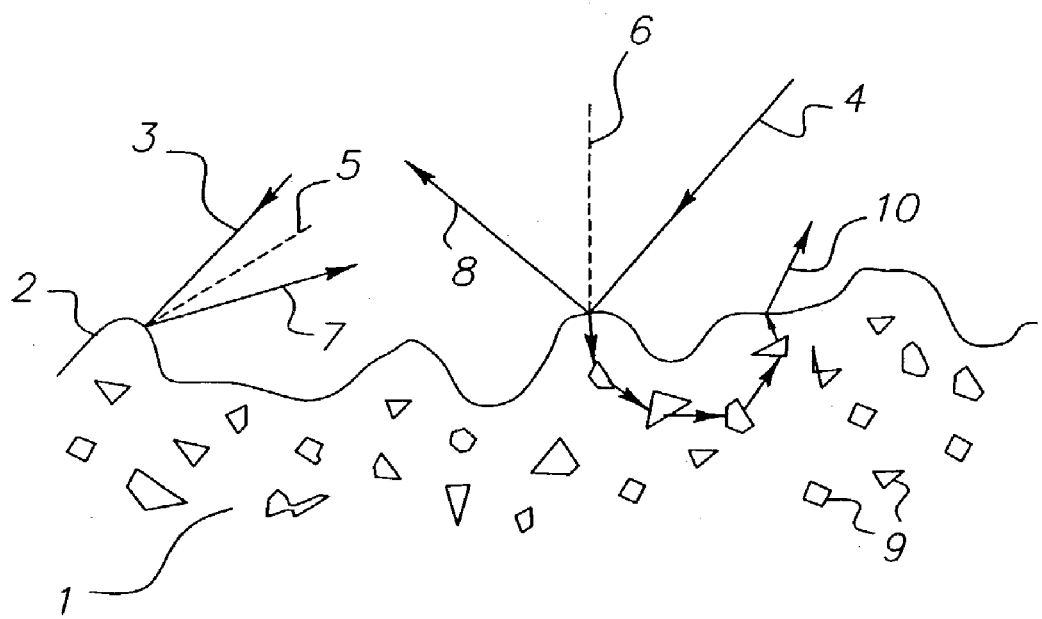
FIG. 1 represents the specular and diffuse components of the light reflection produced by an irregular material.

FIG. 1 represents a material 1 comprising a surface 2, with the material 1 comprising pigments 9 that color the material 1. The material 1 is a material that to be "irregular" is pigmented. Incident light rays 3, 4 are reflected by the material 1 according to two types of reflection: a specular reflection 7, 8, and a diffuse reflection 10. The specular reflection 7, 8 occurs at the surface 2 of the material 1, according to an angle, in relation to the normal 5, 6 to the surface 2, that is symmetrical to the angle formed by the incident ray 3, 4 with the normal 5, 6. The diffuse reflection also called body reflection 10, occurs in the material 1, and has variable direction according to the color pigments 9 found inside the material 1. The mathematical model that describes the reflection process represented by FIG. 1, is the dichromatic reflection model.

Figure 2:
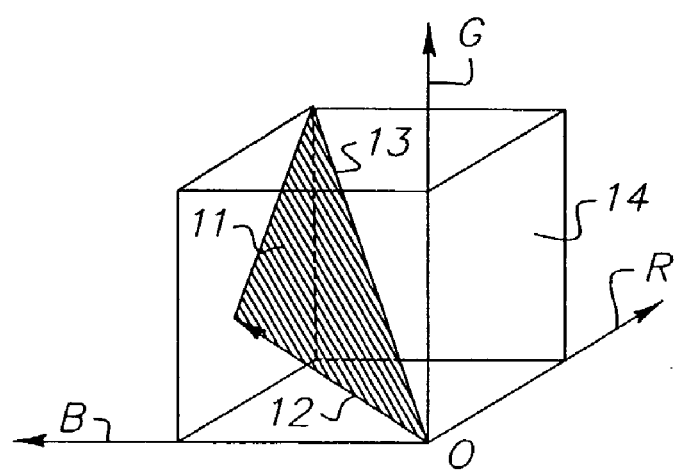
FIG. 2 represents a dichromatic plane defined by color vectors reflected by an irregular surface.
Figure 3:
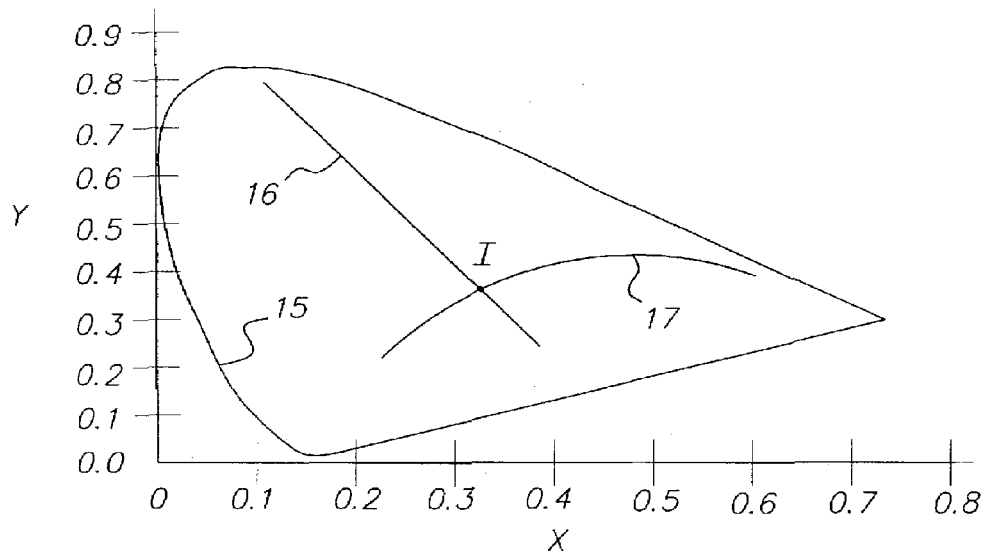
FIG. 3 represents the chromatic diagram of the CIE, in which is represented the diagram of the daytime illuminants, and a straight line for the chromatic convergence of an object in the image.

FIG. 2 represents a cube 14 of the color space of an acquisition system, in which two vectors 12 and 13 respectively represent the specular reflection and the diffuse reflection from the surface 2. The acquisition system is a device enabling digital images to be produced, for example a digital camera or a scanner. The vectors 12, 13 form the dichromatic plane 11. According to FIG. 3, the dichromatic plane 11 is represented by a straight line 16, in the chromatic diagram 15 of the CIE (International Commission on Illumination). The diagram of the daytime illuminants 17 cuts the straight line 16 at the point I. The coordinates of the point I are the chromatic coordinates of the illuminant. The diagram of the daytime illuminants is, for example, determined by the equation $Y_d=-3X_d^2+2.87X_d-0.275$, where $X_d$ and $Y_d$ represent the chromatic coordinates.

Figure 4:
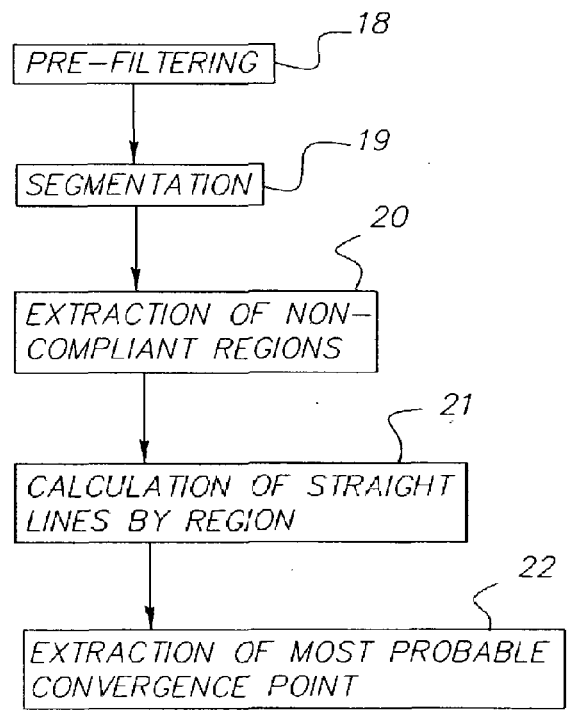
FIG. 4 represents a functional diagram of the method of the invention.
Figure 5:
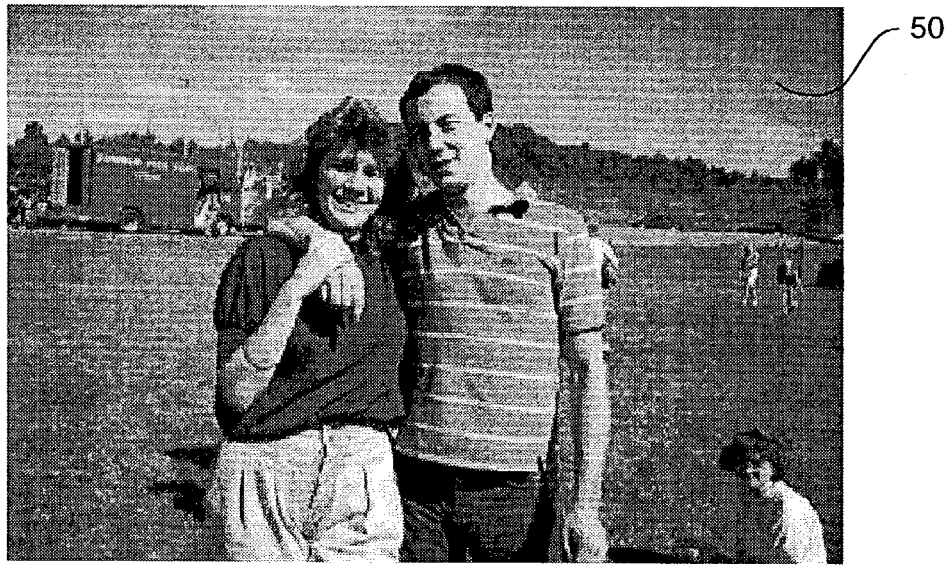
FIG. 5 represents an example of a color source image.
Figure 6:
FIG. 6 represents an example of the pre-filtered source image.

FIG. 4 represents a functional diagram of the operations of the algorithm that automatically implements the steps of the method of the invention. According to a preferred embodiment of the invention, the algorithm enables, from a source image 50 according to FIG. 5, the image 50 to be pre-filtered, to remove the noise of the image 50. The pre-filtering operation 18 (FIG. 4) homogenizes the image, by replacing the image pixels with a neighborhood pixel value, the value nearest to the median value of the neighborhood. The median value of neighborhood pixels is, for example, determined by referring to the center of gravity of the cloud of points formed by the neighborhood pixels in the color space of the image. According to a variant of the preferred embodiment, the pre-filtering step is completed, for example, by simplifying the image gradient, calculated in the CIE-Lab color space by the Euclidean distance. Image values corresponding to a minimum gradient are used to label the regions linked with the basin of the image's gradient. Thus, according to FIG. 6, a pre-filtered image 60 called a mosaic-image is obtained.

After the pre-filtering step 18 resulting in the mosaic-image 60, the method of the invention performs a segmentation 19 (FIG. 4) of the image 60. The segmentation enables the image to be divided into connected and homogeneous color regions 71, 72. (FIG. 7) The limits of these regions are different than the limits of the neighborhoods of the pre-filtering step. The method of the invention enables the image to be segmented into regions of homogeneous chrominance in the case of the segmentation of a color region. The method of the invention further enables the image to be segmented into regions of homogeneous luminance in the case of the segmentation of a gray region. According to a particular embodiment of the segmentation, the algorithm of the method of the invention uses the "watershed" method. This "watershed" method, known to those skilled in the art, enables spatial segmentation. According to a particular embodiment, the watershed method is applied to the gradient of the color image, expressed in the CIE-Lab space. The gradient is calculated by the maximum Euclidean distance found between two pixels of a given region. The Euclidean distance in the CIE-Lab space is given by the formula:

$$\Delta EL^*a^*b^* = [(L_1^* - L_2^*)^2 + (a_1^* - a_2^*)^2 + (b_1^* - b_2^*)^2]^{1/2}$$

Figure 7:
FIG. 7 represents an example of the pre-filtered and segmented source image.

This embodiment, using the watershed, for example enables the segmented image 70 of FIG. 7 to be obtained.

The segmentation step is followed by the step 20 (FIG. 4) of extracting non-compliant regions. These regions are not compliant with the assumptions linked to the dichromatic reflection model whose physical principle corresponds to FIG. 1. The assumptions linked to the dichromatic reflection model in particular integrate the irregularity of the material 1, the reflection capacity of the material 1, and the illumination of the material 1. The incident rays from the light source (illumination), in relation to the material, are directed, i.e. correspond with the rays from a non-diffuse light source.

Figure 8:
FIG. 8 represents an example of an image comprising regions selected for analysis by the method of the present invention.

According to a preferred embodiment of the extraction of non-compliant regions, the method of the invention enables for example, according to FIG. 8, the extraction of a set of shadow regions 24, regions of sky 23, and achromatic (colorless) regions 25, of the image. Step 20 is implemented, for example, by using the extraction of the shadow regions described in French Patent Application 0108907. Step 20 is also implemented, for example, by using the extraction of the sky regions described in French Patent Application 0108912. The extraction of achromatic, colorless regions, is performed with thresholding of the color saturation. According to a particular embodiment, the thresholded image is represented in the HLS color space (Hue Luminance Saturation), and the threshold digital value is, for example, "12". After performing the extraction operation, for example, according to FIG. 8, the image 80 is obtained, from which are extracted the sky 23, shadow 24 and achromatic 25 regions. In the example of the source image 50, the achromatic region 25 is, for example, a strip of gray asphalt.

Based on the image 80, for every region 30 not extracted from the image 80, the method of the invention determines the direction (straight line) of chromatic convergence, from the chromatic coordinates of the pixels forming the region 30. After the extraction of the non-compliant regions of the image and according to a preferred embodiment of the invention represented on the functional diagram of FIG. 4, the method of the invention performs, per non-extracted region 30, a linear regression on the chromatic coordinates of the pixels forming the region 30. The method of the invention thus obtains the slope and ordinate values originating the straight-line equations that characterize the chromatic convergence of the non-extracted regions.

Figure 9:
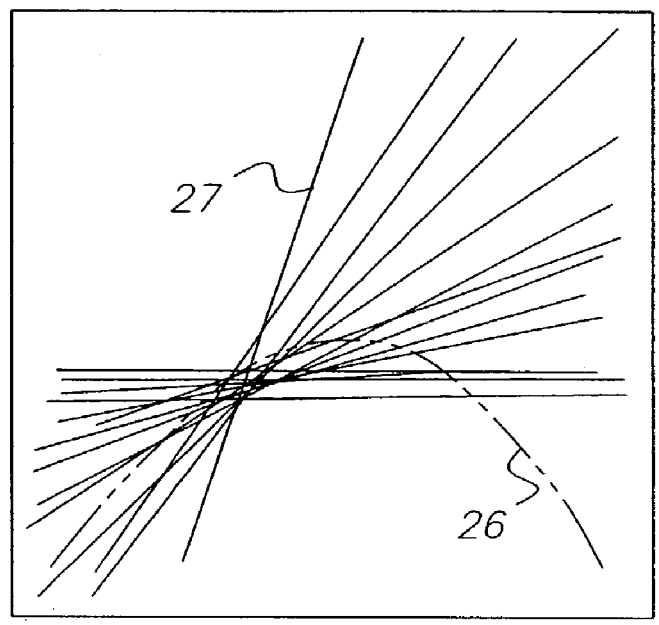
FIG. 9 represents a set of straight regression lines of the selected regions, in the dichromatic plane comprising the diagram of the daytime illuminants.

FIG. 9, in a system corresponding to the CIE chromatic diagram, represents an example of a set 27 of linear regression lines of the non-extracted regions 30, and the diagram of the daytime illuminants 26.

Figure 10:
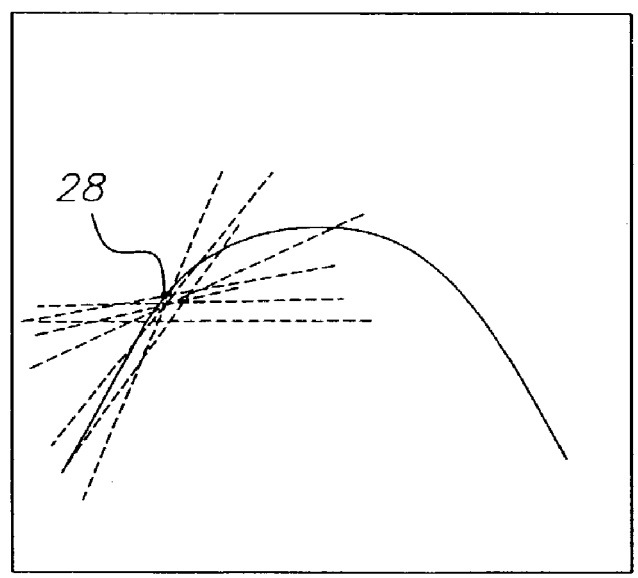
FIG. 10 represents the most probable convergence points corresponding to the illuminants of the analyzed image.

FIG. 10 represents the most probable points of convergence located on the diagram of the daytime illuminants. The most probable convergence point 28 determined by the method of the invention, is located at the intersection of the beam 27 that represents the set of straight lines 27 and the diagram of the daytime illuminants 26. The most probable convergence point 28 is the point of the diagram of the daytime illuminants 26 through which pass a maximum (the point the most frequented by the straight lines) of the straight lines forming the beam 27. The coordinates of the convergence point 28 are the chromatic coordinates that characterize the chrominance (color) of the illuminant of the source image 50.

The invention has been described in detail with particular reference to certain preferred embodiments thereof, but it will be understood that variations and modifications can be effected within the spirit and scope of the invention.

What is claimed is:

1. An automatic method for determining an illuminant of a digital color image, the method comprising the steps of:
    a) segmenting an image into regions of homogeneous color;
    b) extracting the regions from the segmented image that are non-compliant with a dichromatic reflection model;
    c) for each region not extracted from the image, determining from chromatic coordinates of pixels forming said region, a straight line representing a direction of a chromatic convergence;
    d) determining a most probable convergence point of a set of the straight lines obtained in said step c); and
    e) determining chromatic coordinates of the most probable convergence point obtained in said step d) and representing an illuminant of the color image.

2. The method according to claim 1, further comprising a preliminary step of pre-filtering the image, just before the step of segmenting the image into regions of homogeneous color.

3. The method according to claim 1, wherein the segmentation of the image divides said image spatially into regions of homogeneous color.

4. The method according to claim 1, wherein the segmentation of the image is performed by applying a watershed to a gradient of the image, said gradient being calculated by using a Euclidean distance in a CIE-Lab space.

5. The method according to claim 3, wherein the regions of homogeneous color are regions of homogeneous chrominance.

6. The method according to claim 3, wherein the regions of homogeneous color are regions of homogeneous luminance.

7. The method according to claim 1, wherein the regions extracted in said step b) are shadow regions of the image.

8. The method according to claim 1, wherein the regions extracted in said step b) are sky regions of the image.

9. The method according to claim 1, wherein the regions extracted in said step b) are achromatic regions of the image.

10. The method according to claim 1, wherein for each non-extracted region of the image, the straight line representing the direction of the chromatic convergence is determined by linear regression from the chromatic coordinates of pixels forming said region.

11. The method according to claim 1, wherein the most probable convergence point is the point of a chromatic diagram through which pass a maximum of straight lines obtained in said step c).

12. The method according to claim 1, wherein the most probable convergence point is the point of a diagram of daytime illuminants through which pass a maximum of straight lines obtained in said step c).

* * * * *